(12) United States Patent
Fin et al.

(10) Patent No.: US 10,575,675 B2
(45) Date of Patent: Mar. 3, 2020

(54) EMULSIFYING DEVICE AND METHOD TO PRODUCE FROTHED MILK AND THE LIKE

(75) Inventors: Giuseppe Fin, Venice (IT); Marco Santini, Treviso (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1557 days.

(21) Appl. No.: 12/445,369

(22) PCT Filed: Oct. 17, 2007

(86) PCT No.: PCT/IT2007/000720
§ 371 (c)(1),
(2), (4) Date: Apr. 13, 2009

(87) PCT Pub. No.: WO2008/050366
PCT Pub. Date: May 2, 2008

(65) Prior Publication Data
US 2010/0011968 A1    Jan. 21, 2010

(30) Foreign Application Priority Data
Oct. 27, 2006    (IT) .................... FI2006A0263

(51) Int. Cl.
*A47J 31/44*    (2006.01)
(52) U.S. Cl.
CPC ................. *A47J 31/4485* (2013.01)
(58) Field of Classification Search
CPC .... A47J 31/4485; A47J 31/60; A47J 37/0835; A47J 37/0611; A47J 37/08; A23L 5/15; A23V 2002/00

USPC ........ 99/323.1, 452, 453, 300, 280; 426/474
See application file for complete search history.

(56) References Cited

U.S. PATENT DOCUMENTS

| | | | | |
|---|---|---|---|---|
| 2,903,359 A | * | 9/1959 | Bonotto .................. | A23F 5/486 426/319 |
| 4,715,274 A | * | 12/1987 | Paoletti .......................... | 99/454 |
| 4,779,519 A | | 10/1988 | Giuliano | |
| 4,982,655 A | * | 1/1991 | Wen-Der ................ | A47J 31/56 116/109 |
| 5,154,110 A | * | 10/1992 | Chang ..................... | A47J 31/30 99/281 |
| 5,207,148 A | * | 5/1993 | Anderson ............... | A47J 31/36 137/893 |

(Continued)

FOREIGN PATENT DOCUMENTS

| | | |
|---|---|---|
| DE | WO 00/16674 | 3/2000 |
| EP | 0 719 514 A1 | 7/1996 |

(Continued)

OTHER PUBLICATIONS

Office Action issued in connection with corresponding 2009-534062, dated Jun. 29, 2012, 8 pages.

(Continued)

*Primary Examiner* — Jimmy Chou
(74) *Attorney, Agent, or Firm* — Schott, P.C.

(57) ABSTRACT

The device comprises: a milk feed pipe (11); an air inlet duct (15); a pressurized steam feed pipe (17); an emulsion chamber (41), in which milk and air, drawn by means of the pressurized steam, are mixed and emulsified; along the steam feed pipe (17), a valve to place the steam feed pipe in communication with the outside and to cause emptying of the milk feed pipe.

14 Claims, 2 Drawing Sheets

(56) References Cited

U.S. PATENT DOCUMENTS

| | | | |
|---|---|---|---|
| 5,265,519 A | 11/1993 | Schiettecatte et al. | |
| 5,330,266 A | 7/1994 | Stubaus | |
| 5,339,725 A | 8/1994 | De'Longhi | |
| 5,388,502 A * | 2/1995 | Hufnagl | A47J 31/3671 99/295 |
| 5,472,042 A * | 12/1995 | Veltman et al. | 165/281 |
| 5,490,447 A | 2/1996 | Giuliano | |
| 5,778,765 A * | 7/1998 | Klawuhn | A47J 31/46 99/290 |
| 5,884,552 A | 3/1999 | Lussi et al. | |
| 6,006,654 A * | 12/1999 | Pugh | A47J 31/4485 261/DIG. 76 |
| 6,086,833 A * | 7/2000 | Conners | A61L 2/202 422/292 |
| 6,253,667 B1 * | 7/2001 | Lussi et al. | 99/455 |
| 6,499,389 B1 | 12/2002 | Probst | |
| 6,537,596 B1 * | 3/2003 | Junior et al. | 426/28 |
| 7,228,793 B2 * | 6/2007 | Ling et al. | 99/468 |
| 7,600,467 B2 * | 10/2009 | Coccia | A47J 31/4485 99/293 |
| 7,770,511 B2 * | 8/2010 | Yao | 99/293 |
| 2002/0152895 A1 * | 10/2002 | Duffy et al. | 99/279 |
| 2005/0005780 A1 * | 1/2005 | Beretta | A47J 31/4489 99/453 |
| 2005/0172833 A1 * | 8/2005 | Ioannone et al. | 99/453 |
| 2009/0101021 A1 * | 4/2009 | Tonelli | A47J 31/4485 99/290 |
| 2010/0011968 A1 * | 1/2010 | Fin | A47J 31/4485 99/323.1 |
| 2010/0236416 A1 * | 9/2010 | Bonsch | A47J 31/4485 99/280 |
| 2011/0094541 A1 * | 4/2011 | Douma | 134/22.11 |
| 2011/0146500 A1 * | 6/2011 | Boussemart | A47J 31/4489 99/323.1 |
| 2013/0145936 A1 * | 6/2013 | Dollner | A47J 31/4485 99/293 |
| 2015/0150408 A1 * | 6/2015 | Schlee | B01F 5/0413 426/474 |

FOREIGN PATENT DOCUMENTS

| | | |
|---|---|---|
| EP | 0 803 220 A1 | 10/1997 |
| EP | 0 858 757 B1 | 8/1998 |
| EP | 1 132 032 B1 | 9/2001 |
| EP | 1 441 626 B1 | 8/2004 |
| EP | 1 688 074 A1 | 8/2006 |
| IT | WO 91/00041 | 1/1991 |
| JP | H06-11387 B2 | 2/1994 |
| JP | H06-34746 Y2 | 9/1994 |
| JP | H07-8260 B2 | 2/1995 |
| JP | H10-71087 A | 3/1998 |
| JP | 2005245499 A | 9/2005 |
| JP | 2006280727 A | 10/2006 |
| RU | 2128461 C1 | 4/1999 |
| RU | 2218067 C2 | 12/2003 |

OTHER PUBLICATIONS

Office Action issued in connection with corresponding 2007310419, dated Nov. 1, 2012, 4 pages.

Notice of Allowance issued in connection with corresponding 2009-534062, dated Jan. 4, 2013, 5 pages.

Office Action issued in connection with corresponding 2262/CHENP/2009, dated Jan. 30, 2017, 9 pages.

English Translation of Office Action issued in connection with corresponding CN application No. 200780039927.4 dated May 10, 2010, 5 pages.

English Translation and Notice of Allowance issued in connection with corresponding RU application No. 2009120066, dated Jun. 14, 2011, 17 pages.

English Translation and Office Action issued in connection with corresponding BR application No. PI0718139-6 dated Mar. 22, 2018, 12 pages.

* cited by examiner

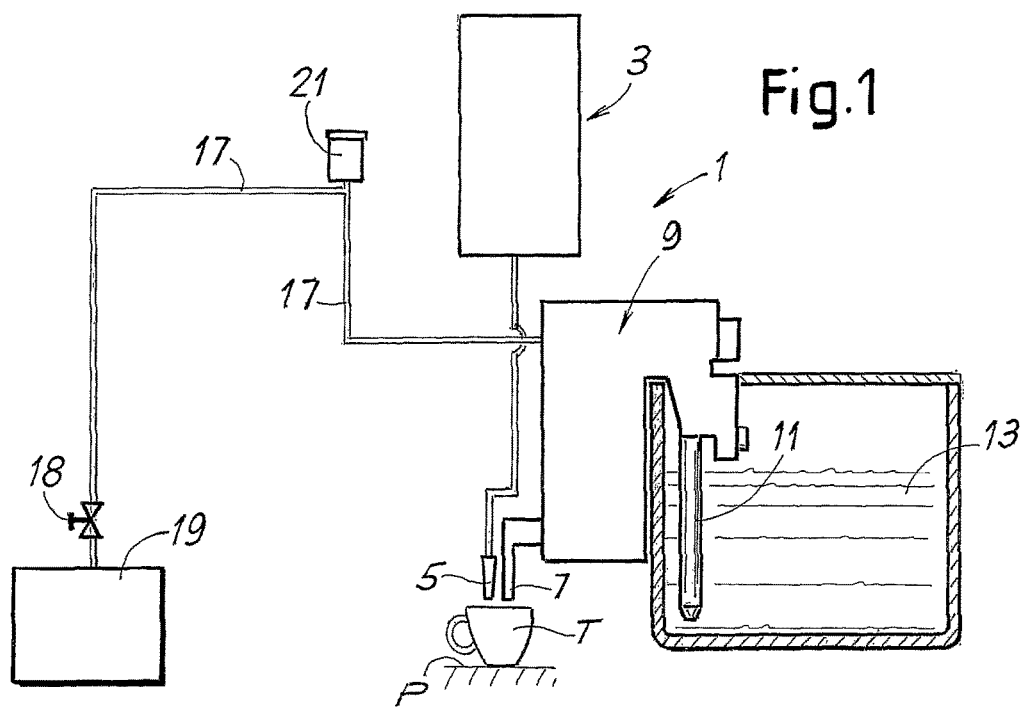
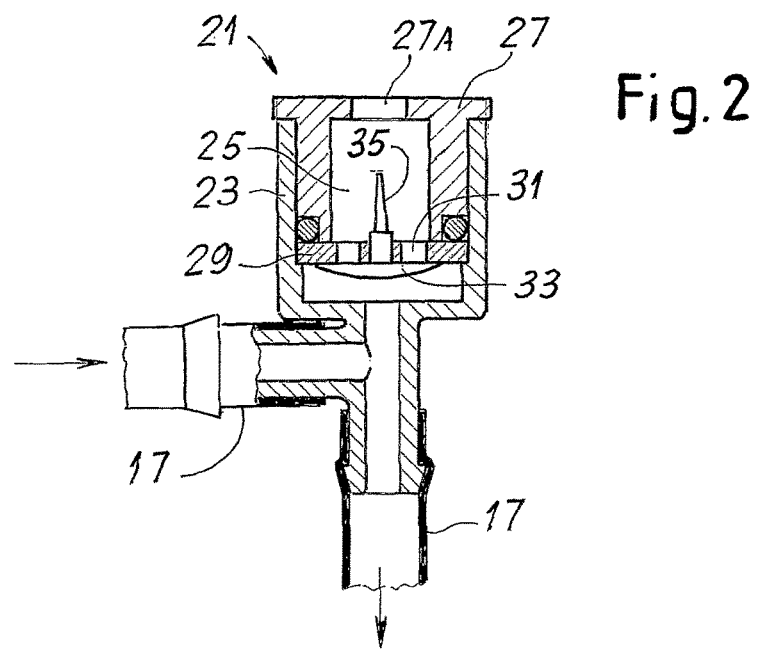

EMULSIFYING DEVICE AND METHOD TO PRODUCE FROTHED MILK AND THE LIKE

TECHNICAL FIELD

The present invention relates to improvements to emulsifying devices to produce emulsified milk through suction of air and milk by means of a flow of steam.

STATE OF THE ART

Machines to produce coffee are in some cases provided with devices to produce milk froth, to prepare cappuccino or similar beverages. These devices include a pipe to draw milk from a specific reservoir and an ambient air inlet duct. A flow of steam, coming from a suitable steam generator, fed into a suitable pipe, such as a Venturi tube, causes a vacuum pressure which draws milk and air. The flow of air, milk and steam creates an emulsion, the hot steam heats the milk and consequently an emulsion at the required temperature can be obtained.

An emulsifying device of this type is described, for example, in EP-A-719514. The mixture of air and milk is drawn by means of the suction produced by a flow of steam in an emulsion chamber in which the froth is formed and from here the froth is dispensed through a dispensing spout into a cup or other container.

WO-A-0016674 and EP-858757 describe similar emulsifying devices with a Venturi tube axially aligned with an emulsion chamber, into which milk and air are drawn by the suction produced in the Venturi tube by the flow of pressurized steam. A similar device is described in the equivalent U.S. Pat. No. 6,499,389.

WO-A-9100041 describes a machine for producing coffee, the dispensing spout of which is associated with an emulsifying device that receives milk from a container, such as a sachet of milk or the like, and ambient air drawn by means of the steam produced in a specific boiler.

Other emulsifying devices are described in U.S. Pat. Nos. 4,779,519, 5,265,519, 5,330,266, 4,715,274, EP-A-1441626.

In some emulsifying devices it is also possible to shut off air suction to produce only hot milk by mixing the hot pressurized steam and the milk drawn by means of vacuum pressure into the Venturi tube. In this case, the steam and milk are mixed in the emulsion chamber to produce hot milk without froth. A device with this function is described in EP-A-1688074, the content of which is fully incorporated in the present description.

EP-A-1132032, EP-A-0803220 and U.S. Pat. No. 6,253,667 describe an emulsifying device with a double pipe for suction of milk from a container positioned in a refrigerated chamber. The two suction pipes make it possible to obtain, in the same emulsion chamber, hot milk or frothed milk by mixing with hot steam only or with hot steam and air.

In EP-A-1688074 and U.S. Pat. No. 6,253,667 a discharge valve is provided on the milk suction pipe, to feed air into the milk suction pipe at the end of the emulsion process. This valve is located in the highest point of the pipe, in communication with the milk reservoir, so that by opening the valve air enters the milk pipe causing emptying of said pipe by gravity. This prevents milk from remaining in the suction pipe with harmful consequences for the quality of the emulsified milk and also negative effects in terms of hygiene deriving from deterioration of the milk which would otherwise remain in the pipes. Emptying of other areas in which milk is present is not so efficient. In fact, the absence of suitable back-pressure in the emulsion chamber does not allow safe emptying of the area of the device downstream of the point in which milk is mixed with air.

Moreover, these devices require special valves with respective opening controls to discharge milk from the pipes. The valve opening and closing device requires additional control elements, subject to wear and which can give rise to malfunctions and which in any case increase the overall cost of the emulsifying device.

OBJECTS AND SUMMARY OF THE INVENTION

According to a particular aspect, an object of the present invention is to provide an emulsifying device which overcomes entirely or in part the aforesaid drawbacks. More specifically, according to an advantageous embodiment, the object of the invention is to produce an emulsifying device which allows improved, more efficient and more reliable discharge of milk from the pipes of the emulsifying device.

In substance, according to a possible embodiment, an emulsifying device is provided comprising: a milk feed pipe; an air inlet duct; a pressurized steam feed pipe; an emulsion chamber in which milk and air, drawn by means of pressurized steam, are mixed and emulsified. A controlled passage is provided along the steam feed pipe to selectively place the steam feed pipe in communication with the outside and to cause discharge of the milk feed pipe when the controlled passage is opened, i.e. at the end of an operating cycle. It is thus possible to place the steam feed pipe in communication with the outside to supply a sufficient quantity of air to the device when there is still residual steam pressure. This ensures improved cleaning of the device.

According to an advantageous embodiment, a valve to control opening and closing of the passage is arranged in said passage. Preferably, the valve is produced so that opening and closing are controlled by the pressure of the steam in the steam feed pipe. In this way opening of the valve and, consequently, discharge of milk from the pipes takes place automatically, without the need for secondary control devices, by means of the variation in pressure in the steam pipe alone. When the production cycle is started the steam pressure inside the steam feed pipe increases rapidly to almost immediately close the valve and consequently prevent pressurized steam from exiting from the communication passage between the inside of the steam feed pipe and outside. At the end of the operating cycle, i.e. when an adequate quantity of emulsified milk has been produced, the steam pressure is reduced more or less gradually with a throttle valve or in any other suitable way, which causes automatic opening of the discharge valve that connects the steam feed pipe with the outside.

The valve can be suitably calibrated so that it opens before the pressure in the steam feed pipe drops below a predetermined value in relation to the ambient pressure. For example, according to an advantageous embodiment, the valve can be designed to open when the overpressure of the steam in relation to the ambient pressure is between 5 and 45 mbar, preferably between 10 and 40 mbar and even more preferably between 20 and 40 mbar. In this way, the valve is opened to allow the inflow of large quantities of air before the flow of steam towards the emulsion chamber terminates. This results in a washing effect of the entire area in which milk may be present, as well as automatic discharge by gravity of the milk suction pipe upstream of the area where it is mixed with steam.

Therefore, besides the advantage of obtaining automatic opening and closing as a function of the variation in steam pressure inside the steam feed pipe, with this particular embodiment of the invention a more efficient cleaning action and discharge of residues of milk from the emulsifying device is also obtained.

Further advantageous features and embodiments of the device according to the invention are indicated in the appended claims and will be described hereunder in greater detail with reference to a non-limiting example of embodiment of the invention.

The invention also relates to a method to produce emulsified milk by means of a device of the type described above, comprising the steps of:
  feeding pressurized steam into said steam feed pipe, with said passage closed;
  by means of the pressurized steam, drawing milk and air through said milk feed pipe and said air inflow duct respectively;
  dispensing milk emulsified through mixing air and milk;
  after dispensing, reducing the steam pressure, opening said passage and allowing air to enter the milk feed pipe through said passage, discharging the milk contained therein and ejecting the residual milk from the mixing area and from the emulsion area by means of a residual flow of steam.

BRIEF DESCRIPTION OF THE DRAWINGS

The invention will be better understood by following the description and accompanying drawing, which shows a non-limiting practical embodiment of the invention. More specifically, in the drawing:

FIG. 1 shows a simplified diagram of a device according to the invention fitted to a machine for dispensing coffee, only schematically represented;

FIG. 2 shows a section of the valve for opening and closing the steam inflow pipe in a possible embodiment;

DETAILED DESCRIPTION OF AN EMBODIMENT OF THE INVENTION

Figure 3:
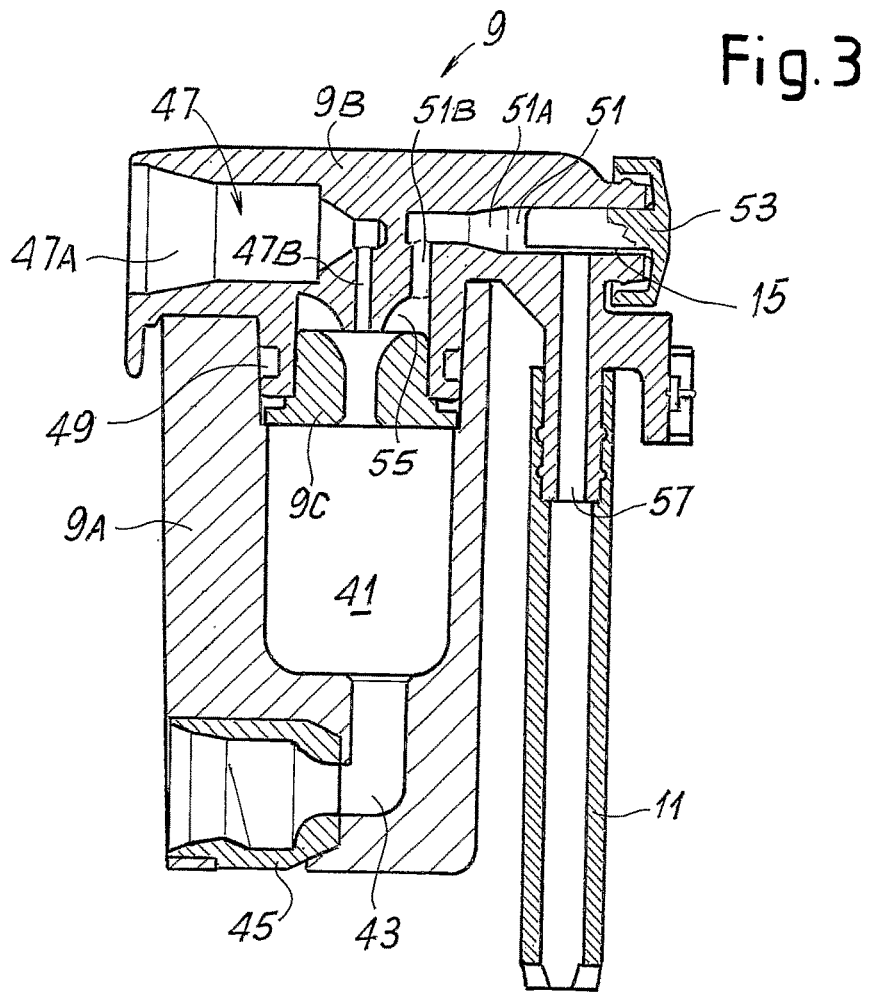
FIG. 3 shows a section of the actual emulsifying device, with the emulsion chamber, the Venturi tube for drawing in milk and air and the discharge pipe of emulsified milk.

FIG. 1 represents, in the form of a block diagram, a machine for producing coffee and emulsified milk. In the machine, indicated as a whole with 1, the coffee production unit 3 can be of any type and is not described herein in greater detail. In this description it is sufficient to mention that it has a single or double spout 5 to dispense coffee into a cup T which can be placed on a surface P of the machine.

Positioned at the side of the spout 5 for dispensing coffee is a second spout 7 for dispensing emulsified milk, i.e. frothed milk, delivered from an emulsifying device, the main body of which is indicated with 9. The emulsifying device 9 is in connection, through a milk feed pipe 11, with a reservoir 13 in which the milk to prepare the emulsion is contained.

The emulsifying device 9 also has an opening 15, described in greater detail with reference to FIG. 3, to draw ambient air and a pressurized steam feed pipe 17 fed from a steam generator 19 or other suitable source of steam at a suitable pressure and temperature. A valve 21 is positioned along the pipe 17 to place the inside of the pressurized steam feed pipe 17 in communication with the outside environment for the purposes described below. A possible embodiment of the valve 21 is represented in FIG. 2. It has a body 23 in which there is a compartment 25 closed at the top by a cover 27 perforated in 27A to place the inside of the compartment 25 in communication with the outside. Positioned inside the body 23 of the valve is a diaphragm 29 with ports 31 which can be closed by a movable closing element 33, guided by a stem 35, under the effect of the pressure present inside the steam pipe 17. The closing element 33, pressed against the diaphragm 29 by the pressure of the steam in the pipe 17, closes the ports 31 preventing communication between the inside of the pipe 17 and the outside environment. When the pressure inside the pipe 17 drops below a certain value, determined by the mechanical specifications of the valve, the closing element 33 is lowered through the effect of its own weight, or optionally with the aid of an elastic element (not shown), to open the ports 31 and place the inside of the pipe 17 in communication with the outside environment through the hole 27A in the cover 27 that closes the compartment 25 of the body 23.

It must be understood that the representation in FIG. 2 is only one of many possible configurations of the valve 21, which can take any suitable form. Preferably, the valve will be designed so that it opens to place the inside of the pipe 17 in communication with the outside environment when the pressure in the pipe 17 drops below a minimum value and to close communication between the inside of the pipe 17 and the outside environment when the pressure in the pipe 17 exceeds a second pre-established pressure value.

In this way, as indicated above, according to the pressure value inside the pressurized steam feed pipe 17, the valve 21 will open or close allowing or preventing the entry of air in the pipe 17.

FIG. 3 shows in detail a section according to a median plane of the body 9 of the emulsifying device in an advantageous embodiment. It must be understood that the description below with reference to FIG. 3 applies to one of the possible methods of producing the body of the emulsifying device, which may vary and take different forms in relation to those illustrated, although these are particularly advantageous for a series of reasons which will be explained below.

The body 9 of the emulsifier is composed substantially of three pieces or parts, indicated with 9A, 9B and 9C. The pieces 9A, 9B and 9C can be produced by molding in a suitable plastic material with adequate rigidity. The piece 9A forms an emulsion chamber 41, in which milk and air drawn by the flow of steam form a froth which is discharged from the emulsion chamber through a hole 43 provided in the base of the emulsion chamber. The hole 43 is connected to a coupling 45 fitted in the piece 9A of the body 9 of the emulsifying device. The coupling 45 is in direct or indirect fluid communication with the spout 7 (FIG. 1). A hole 47, with which the pressurized steam feed pipe 17 connects, is produced in the piece 9B. The hole 47 has a portion with a larger section 47A and a portion with a smaller section 47B coaxial with the piece 9C which forms a Venturi tube. In other words, the piece 9C has an axial hole with a section decreasing gradually from an inlet positioned in front of the outlet of the pipe 47B to an outlet towards the emulsion chamber 41.

The piece 9C forming the Venturi tube is positioned slotted into a seat 49 of the piece 9A, in which a tab of the piece 9B is inserted to hold the intermediate piece 9C in position, which for this purpose has a specific shoulder and a flange that rests against the boss defining the base of the seat 49 as shown in FIG. 3.

Also provided in the piece 9B is a hole 51 with a portion 51A in which a stem or pin 53 is inserted and a portion 51B with a smaller section which leads into a volume 55 over the Venturi tube formed of the piece 9C and delimited between the piece 9C and a surface portion of the piece 9B surrounding the channel or pipe 47B. In this volume 55 and in the volume defined by the hole 51A, 51B, the milk is mixed with the outside air drawn by the flow of steam which is fed into the Venturi tube defined by the piece 9C. The stem 53 has an appropriate section better shown in FIG. 3A.

Figure 3A:
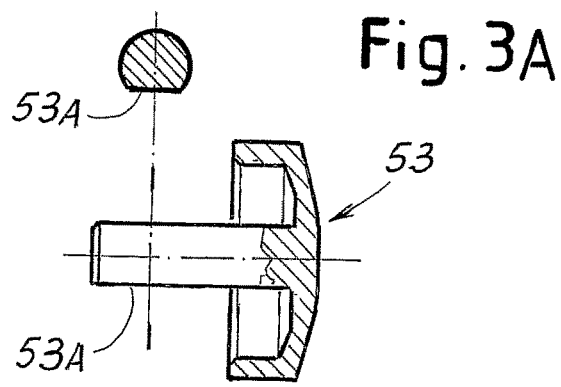
FIG. 3A shows a detail of the device to define the section for passage of air.

As can be seen in FIG. 3A, the stem 53 has a bevel or flattened part 53A and consequently the cross section thereof does not coincide with the section of the hole 51 into which it is fitted. The bevel 53A defines, together with the inner surface of the hole 51, an opening for the air drawn from outside to pass through. Through the same opening milk is drawn through a channel 57 to which the pipe 11 for drawing milk from the reservoir 13 is connected.

Operation of the device described above is as follows. When emulsified or frothed milk must be produced, after placing the cup T under the dispensing spout 7, a tap or valve 18 (FIG. 1) positioned on the pressurized steam inflow 20 pipe 17 is opened. The steam in the pipe 17 immediately reaches sufficiently high pressure, e.g. in the order of 80 mbar of overpressure in relation to the outside environment, which causes almost immediate closing of the valve 21, thereby isolating the inside of the steam inflow pipe 17 in relation to the outside environment. The pressurized steam reaches the body 9 of the emulsifier and 25 flows through the pipe 47A, 47B into the Venturi tube defined by the piece 9C of the body 9.

Acceleration of the steam inside the Venturi tube causes suction to be produced in the volume 55, which draws the milk to be emulsified from the reservoir 13 through the pipe 11. Together with the milk, ambient air is also drawn through the opening defined between the hole 51 and the stem 53. The air and milk are emulsified in the chamber 41 and the high temperature pressurized steam simultaneously heats the milk.

The emulsified beverage is discharged towards the spout 7 through the discharge pipe 43.

The emulsion chamber 41 has a cross section, which is substantially larger than the Venturi tube and thus defines a compensation volume with the following function. If the quantity of steam and/or temperature thereof is excessive in relation to the quantity of milk, the latter would tend to reach the boiling point. In the absence of a suitable volume in the emulsion chamber 41 boiling would block the supply of fluid and consequently obstruct the formation of froth and regular outflow of emulsified milk. The large volume of the infusion chamber 41 ensures that the overpressure produced by local boiling of the milk can be compensated, to prevent blocking the supply of fluids in the emulsion chamber. Therefore, the use of an emulsion chamber having a cross section that increases substantially downstream of the outlet of the Venturi tube also forms a particularly relevant aspect of the present invention.

A further relevant aspect of the present invention is the configuration of the stem 53. With the embodiment illustrated, which comprises a stem with a lateral flattened area, inserted in a hole with a cross section that does not coincide with that of the stem, it is possible to define a simple through hole for the passage of air having very small dimensions without the need to produce calibrated holes in the mass of plastic material forming the body 9 of the emulsifier. In substance, this makes it possible to produce an emulsifying device 9 without the need to pay particular attention to the tolerances of the air inflow openings. Moreover, the flattened conformation of the stem 53 makes it possible, by rotation thereof in its hole 51, to remove any incrustations of milk that can form and can otherwise obstruct the flow of air. The conformation and section of the stem can also be such as to regulate the section of the air inlet opening and the section of the opening for milk feed, as the outlet of the milk inflow pipe is close to the stem and the area in which air and milk are mixed starts in the volume surrounding the stem 53.

Formation of the body 9 of the emulsifier in three pieces 9A, 9B and 9C allows the body of the emulsifier to be formed with a molding process utilizing relatively rigid materials, which makes it possible to produce pieces of considerable dimensional consistency, ensuring compliance with even relatively stringent tolerances on the various parts to be connected to one another. This is important to prevent leaks of fluids through seepage and to facilitate assembly of the various pieces.

Within the scope of this context, it is particularly advantageous to produce the body of the emulsifier with a principal portion 9A defining an emulsion chamber 41, and with a portion 9B closing the emulsion chamber, in which the steam feed pipe and milk inflow pipe are produced, together with the air inflow opening. Also particularly advantageous is the production of the Venturi tube in a third component or portion 9C, with a flange or other contact element, with which the Venturi tube can be blocked in a seat produced, for example, in the lower portion 9A, by means of a flanged portion of the upper portion.

It is understood that the drawing only shows an example provided by way of a practical arrangement of the invention which can vary in forms and arrangements without however departing from the scope of the concept underlying the invention. Any reference numbers in the appended claims are provided to facilitate reading of the claims with reference to the description and to the drawing, and do not limit the scope of protection represented by the claims.

The invention claimed is:

1. An emulsifying device to produce frothed milk, comprising:
    an emulsion chamber;
    a volume in communication with the emulsion chamber;
    a milk reservoir;
    a milk channel in fluid communication between the volume and the milk reservoir for drawing milk from the milk reservoir;
    an air inlet duct having an opening for drawing air and in fluid communication with the volume and the milk channel;
    a steam feed pipe configured to feed pressurized steam into the emulsion chamber when pressure inside the steam feed pipe is above a first pressure value above ambient pressure, wherein feeding of the pressurized steam into the emulsion chamber draws milk and air to be mixed and emulsified; and
    a pressure controlled valve coupled along the steam feed pipe and configured to respond to the pressure inside the steam feed pipe to selectively control inflow of ambient air from the pressure controlled valve to the milk reservoir, through a portion of the steam feed pipe and the milk channel to empty the milk from the milk channel back to the milk reservoir in response to the pressure inside the steam feed pipe falling below a second pressure value above ambient pressure while there is still residual pressurized steam present in the steam feed pipe, and further configured to stop the inflow of the ambient air from the pressure controlled valve in response to the pressure inside the steam feed pipe rising above the first pressure value.

2. The device according to claim 1, wherein the pressure controlled valve is configured to automatically control the inflow of the ambient air.

3. The device according to claim 2, wherein opening and closing of the pressure controlled valve are automatically controlled by the pressure in the steam feed pipe.

4. The device according to claim 3, wherein the pressure controlled valve is configured to automatically close to feed the pressurized steam into the emulsion chamber when the pressure inside the steam feed pipe reaches the first pressure value above ambient pressure, and to automatically open to enable the inflow of the ambient air from the pressure controlled valve when the pressure inside the steam feed pipe reaches the second pressure value above ambient pressure, the second pressure value is less than the first pressure value.

5. The device according to claim 1, wherein the pressure controlled valve is configured to operate with the first pressure value being selected from one of between 60 and 150 mbar, between 80 and 120 mbar, and between 90 and 100 mbar of overpressure in relation to ambient pressure.

6. The device according to claim 5, wherein the pressure controlled valve is configured to operate with the second pressure value being selected from one of between 5 and 45 mbar, between 15 and 40 mbar, and between 20 and 40 mbar of overpressure in relation to ambient pressure.

7. The device according to claim 1, further comprising a Venturi tube connected between the steam feed pipe and the emulsion chamber and between the volume and the emulsion chamber, wherein the air inlet duct and the milk channel converge in the volume, the pressurized steam from the steam feed pipe producing, in the Venturi tube, a vacuum which draws the milk and air through the Venturi tube into the emulsion chamber.

8. The device according to claim 7, wherein the emulsion chamber comprises a cross section substantially larger than the Venturi tube.

9. The device according to claim 7, wherein the emulsion chamber includes a discharge pipe.

10. A method to produce emulsified milk, the method comprising acts of:
providing a steam feed pipe having a pressure controlled valve coupled there along, the steam feed pipe being connected to an emulsion chamber, and an air inlet duct connected with a milk channel and a volume that is also in communication with the emulsion chamber;
feeding pressurized steam through the steam feed pipe into the emulsion chamber when pressure inside the steam feed pipe is above a first value above ambient pressure;
emulsifying milk using the pressurized steam to draw milk from a milk reservoir through the milk channel and draw air through the air inlet duct respectively into the volume;
dispensing the emulsified milk from the emulsion chamber; and
after dispensing
reducing the pressure inside the steam feed pipe to a second pressure above ambient pressure and below the first value,
opening the pressure controlled valve automatically responsive to the reduction of the pressure enabling an inflow of ambient air from the pressure controlled valve, through a portion of the steam feed pipe and the milk channel to the milk reservoir while there is still residual pressurized steam present in the steam feed pipe above ambient pressure, and
discharging the milk from the milk channel to the milk reservoir automatically responsive to the inflow of the ambient air.

11. The device according to claim 4, wherein the second pressure value is selected from one of between 5 and 45 mbar, between 15 and 40 mbar, and between 20 and 40 mbar of overpressure in relation to the ambient pressure.

12. The device according to claim 1, further comprising a stem removably positioned inside the air inlet duct for controlling air access to the milk channel.

13. The device according to claim 1, wherein the pressure controlled valve is configured to enable the inflow of the ambient air into the steam feed pipe before flow of the pressurized steam towards the emulsion chamber terminates.

14. The method of claim 10, wherein the act of opening of the pressure controlled valve enables the inflow of the ambient air into the steam feed pipe before flow of the pressurized steam towards the emulsion chamber terminates.

* * * * *